US008844600B2

(12) United States Patent
Hirata

(10) Patent No.: US 8,844,600 B2
(45) Date of Patent: Sep. 30, 2014

(54) ROTARY LAMINATION APPARATUS

(75) Inventor: Kazuyuki Hirata, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 354 days.

(21) Appl. No.: 13/401,082

(22) Filed: Feb. 21, 2012

(65) Prior Publication Data

US 2012/0216958 A1   Aug. 30, 2012

(30) Foreign Application Priority Data

Feb. 24, 2011   (JP) ................. 2011-038373

(51) Int. Cl.
| | | |
|---|---|---|
| *B29C 65/00* | (2006.01) | |
| *B32B 37/00* | (2006.01) | |
| *B32B 38/04* | (2006.01) | |
| *B32B 38/10* | (2006.01) | |
| *B31F 5/00* | (2006.01) | |
| *B23K 37/00* | (2006.01) | |
| *H02K 15/02* | (2006.01) | |
| *H02K 15/10* | (2006.01) | |
| *B23P 19/00* | (2006.01) | |
| *H02K 15/00* | (2006.01) | |
| *H02K 1/06* | (2006.01) | |
| *B65G 13/00* | (2006.01) | |
| *B21D 43/22* | (2006.01) | |

(52) U.S. Cl.
CPC ................. *H02K 15/02* (2013.01); *B21D 43/22* (2013.01)
USPC ........... 156/517; 156/513; 156/563; 156/580; 29/598; 29/732; 310/216.011; 193/35 SS

(58) Field of Classification Search
CPC .. B23B 38/185; B23B 37/00; B23B 37/0046; B23B 37/0076; B23B 37/04; B23B 37/06; B23B 37/065; B29C 2793/0045; B29C 65/02; B29C 69/005; B29C 69/006; B26D 9/00; H02K 15/16; H02K 15/02; H02K 15/03; B60B 33/04; B60B 33/045; B60B 33/06; B60B 33/066; B60B 33/002
USPC ........... 156/60, 250, 252, 256, 261, 263, 264, 156/269, 270, 349, 350, 353, 354, 358, 362, 156/363, 364, 423, 510, 512, 513, 516, 517, 156/521, 538, 539, 543, 556, 558, 559, 563, 156/580; 228/115, 3.1; 29/596, 598, 732, 29/738, 609; 310/216, 216.001, 216.004, 310/216.011, 254, 261; 16/19, 44; 193/35 SS See application file for complete search history.

(56) References Cited

U.S. PATENT DOCUMENTS 4,347,794 A * 9/1982 Nordstrom ................. 108/57.15
2005/0050714 A1   3/2005 Hashimoto et al.
(Continued)

FOREIGN PATENT DOCUMENTS

| CN | 1595771 | 3/2005 |
| CN | 1929260 | 3/2007 |

(Continued)

OTHER PUBLICATIONS

China Office action, mail date is Feb. 25, 2014.
(Continued)

*Primary Examiner* — Philip Tucker
*Assistant Examiner* — Brian R Slawski
(74) *Attorney, Agent, or Firm* — Greenblum & Bernstein, P.L.C.

(57) ABSTRACT

A rotary lamination apparatus has a rotary lamination turntable rotational about a vertical axis. A plurality of workpieces are rotated and laminated on the turntable. The turntable includes a support member that is arranged on an upper surface of the turntable, a plurality of rolling bodies mounted on the upper surface of the turntable, and a plurality of urging members for urging the rolling bodies upward. The support member is formed of material having a high friction coefficient. The rolling bodies are selectively movable between an upper position and a lower position. In the upper position, at least a portion of each of the rolling bodies is located above the upper surface of the support member. In the lower position, each rolling body is located below the upper surface of the support member. In the upper position, the rolling bodies support the workpieces movably in a lateral direction.

7 Claims, 6 Drawing Sheets

(56) References Cited

U.S. PATENT DOCUMENTS

| | | |
|---|---|---|
| 2005/0229384 A1 | 10/2005 | Yamamoto et al. |
| 2008/0282530 A1 | 11/2008 | Bertocchi et al. |

FOREIGN PATENT DOCUMENTS

| | | |
|---|---|---|
| CN | 101299379 | 11/2008 |
| JP | 04-279229 | 10/1992 |
| JP | 2003-009482 | 1/2003 |
| JP | 2003-019520 | 1/2003 |
| JP | 2006-026735 | 2/2006 |
| JP | 2010-045921 | 2/2010 |

OTHER PUBLICATIONS

Japanese Office Action, mailed May 20, 2014, in corresponding Japanese Application No. 2011-038373.

* cited by examiner

ROTARY LAMINATION APPARATUS

BACKGROUND OF THE INVENTION

The present invention relates to an apparatus for fabricating a laminated product such as a stator core or a rotor core for a motor. Specifically, the invention relates to a rotary lamination apparatus for rotating and laminating core pieces obtained by punching thin plates.

Conventionally, as one such type of apparatus for fabricating a motor core, a configuration disclosed in Japanese Laid-Open Patent Publication No. 2010-45921, for example, has been proposed. Through this configuration, a laminated core is fabricated as described below. Arcuate split core pieces are obtained using a punch and a die. The split core pieces are held between an outer clamp body and an inner clamp body. The outer and inner clamp bodies are turned to rotate the split core pieces and arrange the split core pieces in an annular shape on a turntable. In this manner, an annular core piece is formed. Then, by turning the clamp bodies, annular core pieces are rotated, laminated, and joined on the turntable by offset phases. In this manner, a laminated core is fabricated by stacking a plurality of annular core pieces at different angles, or, in other words, through rotary lamination.

When the annular core pieces are rotated and stacked together, the turntable, which supports a laminated core, is rotated together with the outer clamp body. This prevents sliding between the upper surface of the turntable and the bottom surface of the laminated core, thus preventing sliding scratches from being formed on the laminated core.

SUMMARY OF THE INVENTION

However, normally for the above-described configuration, the upper surface of the turntable, on which the laminated core is mounted, is formed of metal. Since metal has a small friction coefficient, sliding may easily occur between the upper surface of the turntable and the bottom surface of the laminated core. This may form sliding scratches on the laminated core.

Also, in the conventional configuration, after a laminated core is formed on the turntable using a predetermined number of annular core pieces, the turntable is lowered to a product release position. Subsequently, the laminated core is pushed out laterally by a pusher at the product release position and thus released from the turntable. When the laminated core is pressed laterally and moved along the upper surface of the turntable, sliding scratches may be formed on the laminated core.

To solve this problem, the upper surface of the turntable may be smoothed like a mirror surface. In this case, however, foreign matter such iron powder on the upper surface of the turntable can cause damage to the laminated core.

Accordingly, to address the aforementioned problems in the conventional technique, it is an objective of the present invention to provide a rotary lamination apparatus that prevents formation of scratches on a laminated product at the time when punched workpieces are rotated and laminated on a turntable and the time when the laminated product is released from the turntable.

To achieve the foregoing objective, the present invention provides a rotary lamination apparatus having a rotary lamination turntable rotational about a vertical axis. The turntable is adapted to rotate and laminate a plurality of punched workpieces on the turntable. The turntable includes a support member that is arranged on an upper surface of the turntable, a plurality of rolling bodies mounted on the upper surface of the turntable, and a plurality of urging members for urging the rolling bodies upward. The support member is formed of a material having a high friction coefficient compared to metal. The rolling bodies are selectively movable between an upper position and a lower position. In the upper position, at least a portion of each of the rolling bodies is located above an upper surface of the support member. In the lower position, each rolling body is located below the upper surface of the support member. In the upper position, the rolling bodies support the workpieces movably in a lateral direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A rotary lamination apparatus according to a first embodiment of the present invention will now be described with reference to FIGS. 1 to 4.

Figure 1:
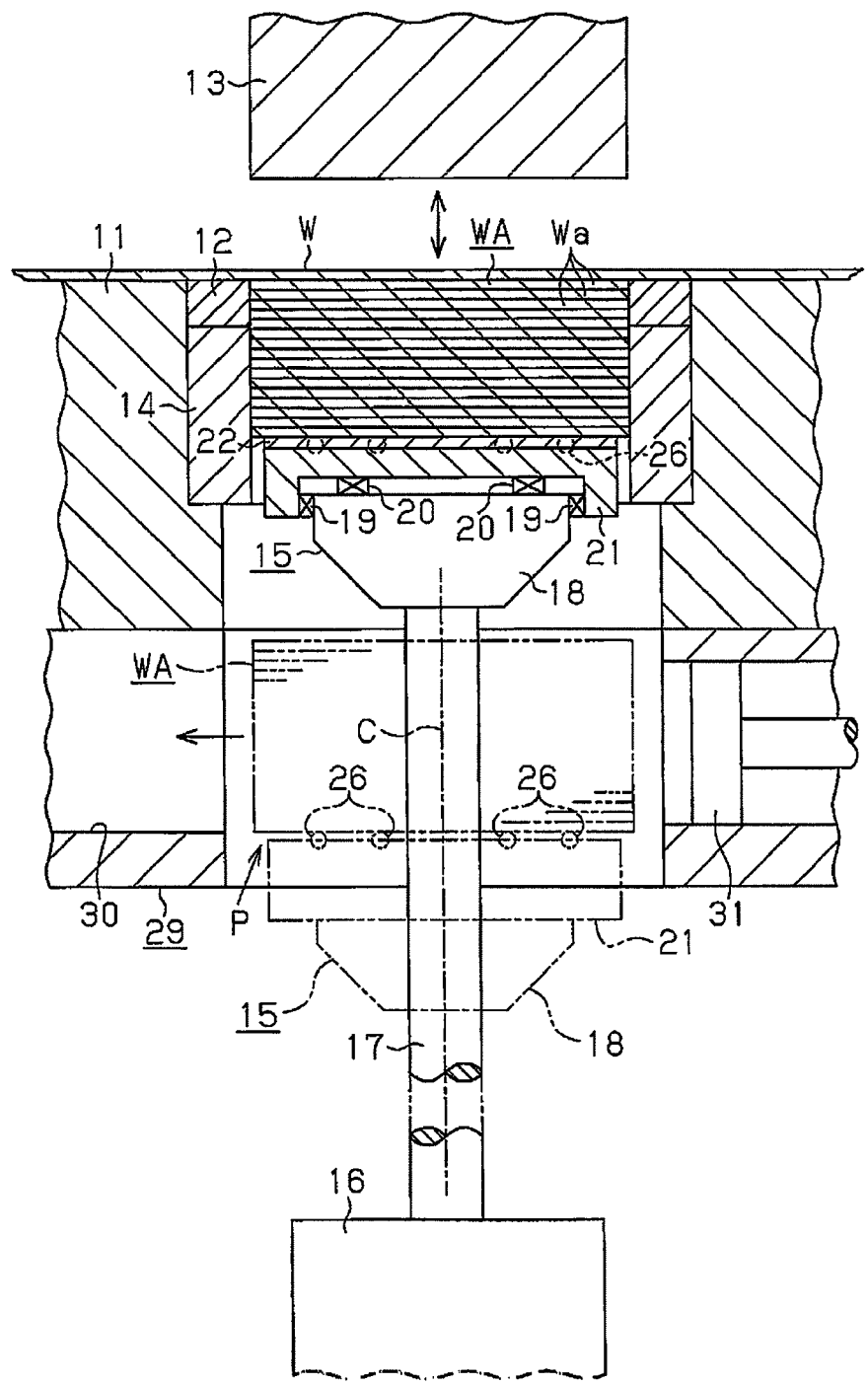
FIG. 1 is a cross-sectional view schematically showing a rotary lamination apparatus according to a first embodiment of the present invention.

As illustrated in FIG. 1, the rotary lamination apparatus of the first embodiment has a tubular holding member 11. The holding member 11 is rotational about a vertical axis C. The holding member 11 is rotated intermittently by a motor (not shown) at a constant angle in one direction. An annular die 12 is fixed to the upper end of the inner peripheral surface of the holding member 11. A punch 13 is arranged above the die 12 and reciprocally movable along the vertical axis C. When an elongated thin plate W is arranged on the holding member 11, the punch 13 is reciprocated in a vertical direction with respect to the die 12. In this manner, punching is performed on the thin plate W to form core pieces Wa having a predetermined shape as a workpiece.

A cylindrical pressing ring 14 is fixed to the inner circumference of the holding member 11 at a position below the die 12. The pressing ring 14 has a diameter slightly smaller than the diameter of each core piece Wa and applies pressure onto the outer peripheral surface of the core piece Wa. A mounting table 15 is arranged in an axial hole formed by the die 12, the pressing ring 14, and the holding member 11 movably along the vertical axis C. After having been formed through punching with the punch 13 and the die 12, core pieces Wa are sequentially mounted on the mounting table 15 while being pressed and held by the pressing ring 14 from the outer circumferences of the core pieces Wa. Before forming each of the core pieces Wa, the holding member 11 is rotated by a motor (not shown) and then the die 12 and the pressing ring 14 rotate integrally with the holding member 11. As a result, each punched core piece Wa is laminated on another core piece Wa located immediately below such that the arrangement angles of these core pieces Wa differ from each other. In this manner, a laminated core WA, which is employed as a laminated product such as a stator core or a rotor core for a motor, is fabricated.

When each punched core piece Wa is laminated on the mounting table 15, the mounting table 15 and the core piece(s) Wa on the mounting table 15 are lowered together with the punch 13. The punch 13 is then raised and, as the punch 13 rises, a lift mechanism 16 raises the mounting table 15 and the core piece(s) Wa. The lift mechanism 16 includes a motor and is connected to the mounting table 15 through a shaft 17. The lift mechanism 16 applies pressure acting in the direction opposite to the pressing direction of the punch 13 to the laminated core WA on the mounting table 15. At this stage, the upper surface of the uppermost one of the core pieces Wa on the mounting table 15 is arranged to be flush with the upper surface of the die 12.

With reference to FIG. 1, the mounting table 15 has a support table 18 and a disk-like rotary lamination turntable 21. The support table 18 is fixed to the upper end of the shaft 17. The turntable 21 is supported by the support table 18 rotationally about the vertical axis C through a radial bearing 19 and a thrust bearing 20. When a punched core piece Wa is rotated and laminated on the upper surface of the turntable 21, the turntable 21 is held in friction contact with the bottom surface of the laminated core WA. Such friction rotates the turntable 21 integrally with the holding member 11, the die 12, and the pressing ring 14.

Figure 2:
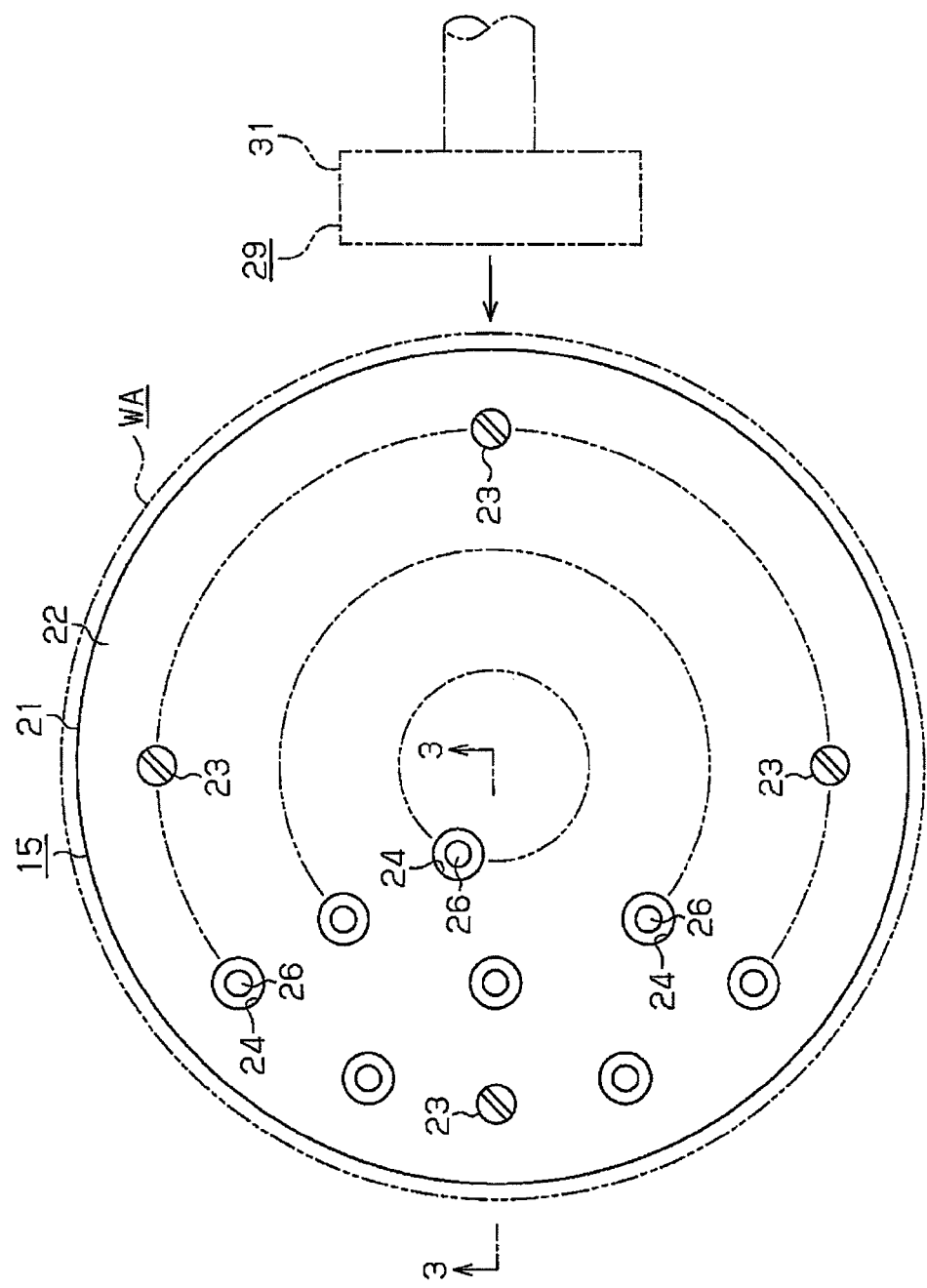
FIG. 2 is a plan view showing a rotary lamination turntable in the rotary lamination apparatus illustrated in FIG. 1.
Figure 3:
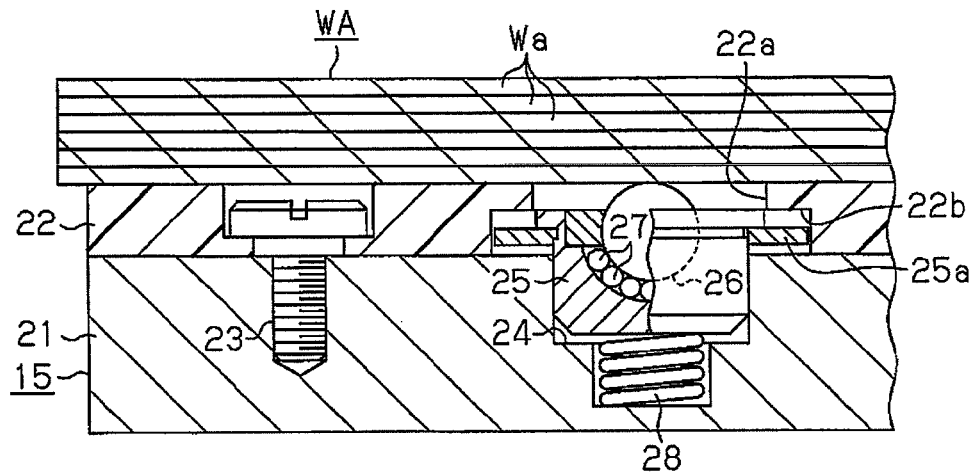
FIG. 3 is an enlarged cross-sectional view taken along line 3-3 of FIG. 2.

As illustrated in FIGS. 1 to 3, a flat plate-like support member 22 is fixed to the upper surface of the turntable 21 using a plurality of screws 23. The support member 22 is formed of elastic material that has a high friction coefficient and is soft compared to metal. The support member 22 is formed of, for example, urethane rubber, acrylic rubber, silicone rubber, chloroprene rubber (CR), or nitrile rubber (NBR). A plurality of recesses 24 are formed in the upper surface of the turntable 21. The support member 22 has a plurality of stepped holes 22a aligned with the recesses 24. A step 22b is formed in the inner circumference of each of the stepped holes 22a. A holder 25 is arranged in each of the recesses 24 movably in the vertical direction. A rolling body 26 is supported in each of the holders 25 through a plurality of small balls 27, which are rotational in every direction. Each of the rolling bodies 26 is formed by a ball that supports the laminated core pieces Wa movably in a lateral direction. When the holders 25 ascend, the rolling bodies 26 move such that at least a portion of each of the rolling bodies 26 rises to a position above the upper surface of the support member 22. When the holders 25 descend, the rolling bodies 26 move such that the rolling bodies 26 are each entirely located at a position below the upper surface of the support member 22. Between the bottom of each recess 24 and the corresponding holder 25, a spring 28 is arranged as an urging member. The springs 28 urge the corresponding rolling bodies 26 upward. Each of the holders 25 has an engagement flange 25a, which is formed around an upper outer peripheral portion of the holder 25. When each holder 25 is lifted by the urging force produced by the corresponding spring 28, upward movement of the holder 25 is restricted through engagement between the engagement flange 25a and the step 22b of the corresponding stepped hole 22a. Each engagement flange 25a and the corresponding step 22b form a restricting member for restricting upward movement of the holder 25. The core pieces Wa are supported by the rolling bodies 26 as the rolling bodies 26 rotate and transported from the turntable 21 to a release port. The arrangement positions and arrangement density of the rolling bodies 26 are determined to prevent the peripheral end of the core pieces Wa from contacting the upper surface of the support member 22 at the time when the core pieces Wa are moved.

As shown in FIG. 1, a release mechanism 29 is arranged below the holding member 11. The release mechanism 29 releases the laminated core WA, which is formed by a predetermined number of core pieces WA, from the turntable 21. The release mechanism 29 has a release port 30, which communicates with the axial hole of the holding member 11 at a position below the pressing ring 14. A pusher 31 is arranged at a position facing the release port 30 with the axial hole of the holding member 11 located between the pusher 31 and the release port 30 in a manner movable along the direction perpendicular to the vertical axis C. After a predetermined number of core pieces Wa are laminated on the turntable 21 of the mounting table 15 and thus a laminated core WA with a predetermined thickness is formed, the lift mechanism 16 lowers the mounting table 15 to a product release position P. In FIG. 1, the mounting table 15 and the laminated core WA each in the state located at the product release position P are indicated by the chain lines. In this state, the pusher 31 moves toward the release port 30 to press the laminated core WA. As a result, the laminated core WA is released from the turntable 21 of the mounting table 15 into the interior of the release port 30.

Operation of the rotary lamination apparatus, which is configured as described above, will hereafter be described.

The rotary lamination apparatus forms a core piece Wa having a predetermined shape from a thin plate W mounted on the holding member 11 through punching by reciprocating the punch 13 with respect to the die 12. Punched core pieces Wa are mounted and sequentially laminated on the turntable 21 of the mounting table 15 while being pressed and held by the pressing ring 14 from the outer circumferences of the core pieces Wa. In this state, the lift mechanism 16 raises the mounting table 15 and applies pressure acting in the direction opposite to the pressing direction of the punch 13 to the laminated core WA on the mounting table 15. As a result, with reference to FIG. 3, each rolling body 26 on the turntable 21 is pressed against the urging force of the corresponding spring 28 and moved to a position below the upper surface of the support member 22 on the turntable 21. This maintains the bottom surface of the laminated core WA in friction contact with the upper surface of the support member 22.

Each time a single core piece Wa or a predetermined number of core pieces Wa are formed through punching, the die 12 and the pressing ring 14 are rotated by a predetermined angle integrally with the holding member 11. In this manner, core pieces Wa are laminated at different angles to form a laminated core WA. This cancels variation in thickness from one punched core piece Wa to another, thus preventing the laminated core WA from having a non-uniform thickness.

Through rotation of the die 12 and the pressing ring 14, core pieces Wa are rotated and laminated on the turntable 21 of the mounting table 15. At this stage, the turntable 21 is in friction contact with the bottom surface of the laminated core WA and thus rotates integrally with the holding member 11, the die 12, and the pressing ring 14. In this state, as illustrated in FIG. 3, the rolling bodies 26 on the turntable 21 are located below the upper surface of the support member 22 and the bottom surface of the laminated core WA is in friction contact with the upper surface of the support member 22. The support member 22 is formed of material that has a high friction coefficient and is soft compared to metal. This prevents sliding between the turntable 21 and the laminated core WA, thus preventing sliding scratches from being formed on the laminated core WA. The core pieces Wa are joined together through engagement between non-illustrated projections and corresponding recesses and thus prevented from moving relative to one another.

Figure 4:
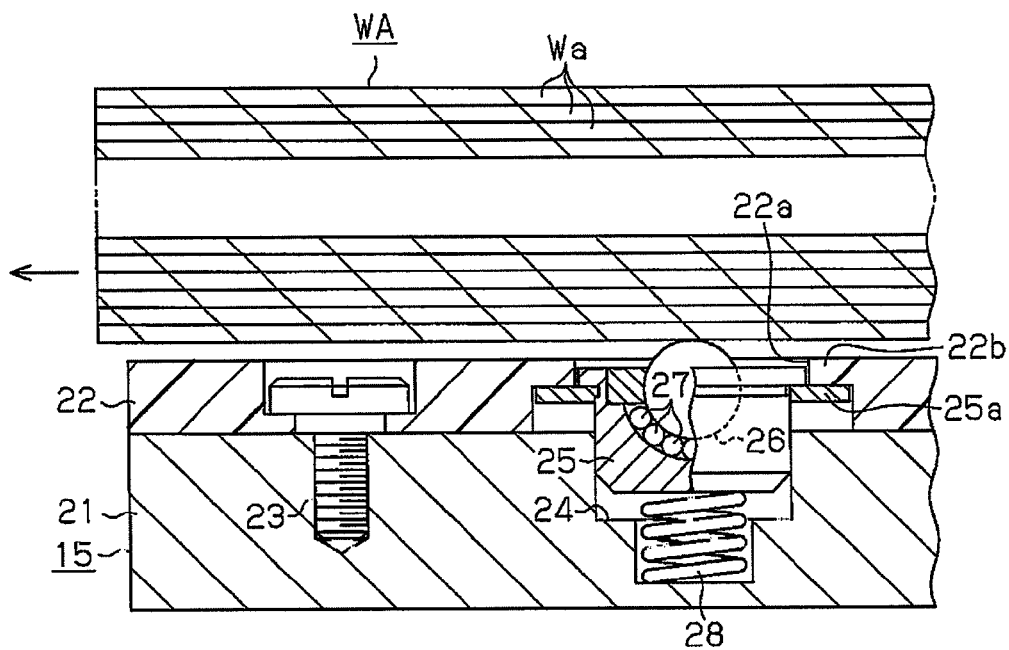
FIG. 4 is a cross-sectional view illustrating an operating state of a rolling body at a product release position, as taken along line 3-3 of FIG. 2.

By laminating a predetermined number of core pieces Wa on the turntable 21 of the mounting table 15, a laminated core WA having a predetermined thickness is formed. Afterwards, the lift mechanism 16 lowers the mounting table 15 to the product release position P as indicated by the chain lines in FIG. 1. At this stage, the laminated core WA is separated from the pressing ring 14, thus reducing the load of the turntable 21 for pressing the laminated core WA. As a result, as shown in FIG. 4, each rolling body 26 on the turntable 21 is moved by the urging force of the corresponding spring 28 in a manner projecting upward from the upper surface of the support member 22. This separates the laminated core WA from the upper surface of the support member 22 such that the laminated core WA is supported on the rolling bodies 26. In this state, by pressing the laminated core WA laterally from the turntable 21 by means of the pusher 31, the rolling bodies 26 are rolled to smoothly release the laminated core WA into the release port 30. This prevents formation of sliding scratches on the laminated core WA at the time when the laminated core WA is released.

The first embodiment has the advantages described below.

(1) In the rotary lamination apparatus of the first embodiment, when a punched core piece Wa is rotated and laminated on the turntable 21, a laminated core WA is supported by the support member 22 on the turntable 21. The support member 22 is formed of material having a high friction coefficient compared to metal. Accordingly, when the core piece Wa is rotated and laminated, sliding between the laminated core WA on the turntable 21 and the turntable 21 is prevented. As a result, scratches from such sliding are prevented from being formed on the laminated core WA.

(2) The rotary lamination apparatus of the first embodiment lowers the turntable 21 to the product release position to release the laminated core WA from the turntable 21. At this stage, the urging force of each spring 28 moves the corresponding rolling body 26 on the turntable 21 in a manner projecting upward from the upper surface of the support member 22. The laminated core WA is thus separated from the support member 22 on the turntable 21 in a state supported by the rolling bodies 26. When, in this state, the pusher 31 laterally presses and releases the laminated core WA laterally from the turntable 21, the rolling bodies 26 support the laminated core WA while rotating, thus preventing the laminated core WA from contacting the upper surface of the support member 22 on the turntable 21. The laminated core WA is thus smoothly released. This prevents formation of sliding scratches on the laminated core WA at the time when the laminated core WA is released.

(3) In the rotary lamination apparatus of the first embodiment, the support member 22 is formed of material softer than metal. Accordingly, even if foreign matter such as swarf is caught between a core piece Wa and the turntable 21, the foreign matter is embedded in the support member 22. This effectively prevents scratch from being formed on a laminated core WA at the time when the core piece Wa is rotated and laminated.

(4) In the rotary lamination apparatus of the first embodiment, each rolling body 26 is configured by a ball that is rotational in any direction. Accordingly, even when the rolling bodies 26 are stopped at any rotational position, the rolling bodies 26 are capable of smoothly releasing the laminated core WA toward the release port 30.

Second Embodiment

A rotary lamination apparatus according to a second embodiment of the present invention will hereafter be described mainly about the difference between the first embodiment and the second embodiment.

Figure 5:
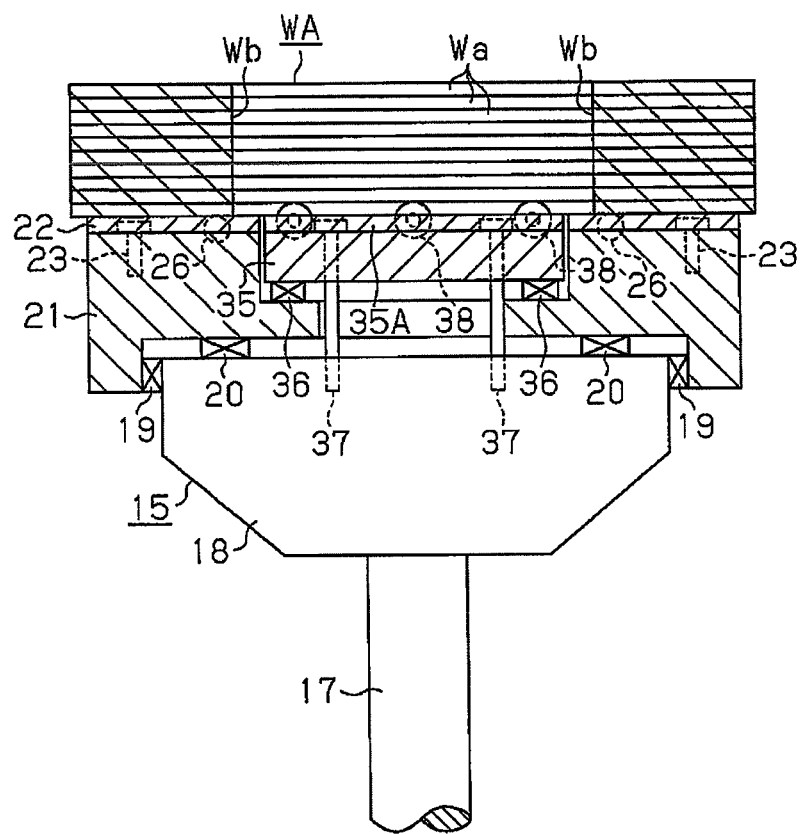
FIG. 5 is a cross-sectional view schematically showing a rotary lamination apparatus according to a second embodiment of the present invention.
Figure 6:
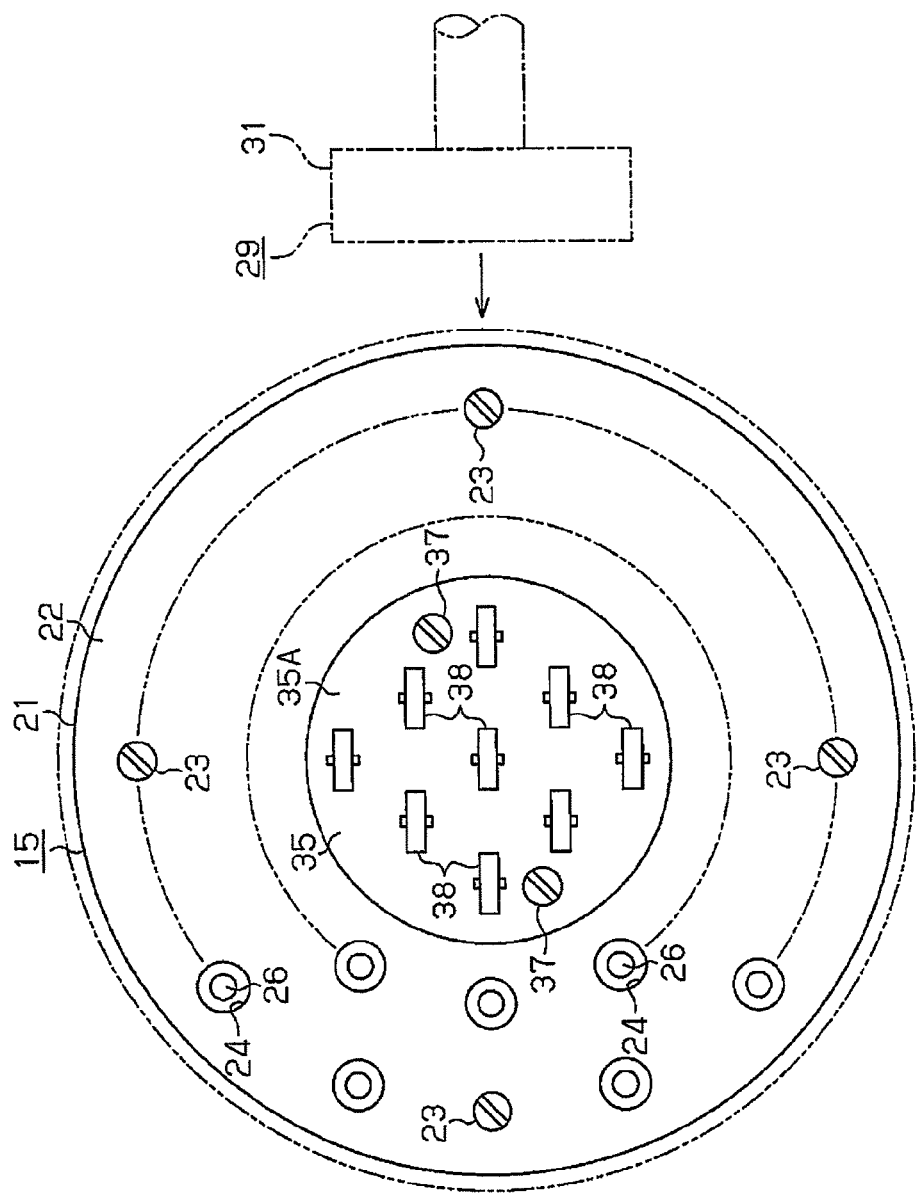
FIG. 6 is a plan view showing a rotary lamination turntable in the rotary lamination apparatus illustrated in FIG. 5.

As shown in FIG. 5, the rotary lamination apparatus of the second embodiment laminates annular core pieces Wa, each of which has a hole Wb formed in a central portion. With reference to FIGS. 5 and 6, the rotary lamination turntable 21 has an annular upper portion. The support member 22 having an annular shape is fixed to the upper surface of the turntable 21. As in the first embodiment, the support member 22 is formed of material that has a high friction coefficient and is soft compared to metal. Also, like the first embodiment, a plurality of rolling bodies 26, each formed by a ball, are arranged on the upper surface of the turntable 21. The rolling bodies 26 are movable to an upper position in which at least a portion of each rolling body 26 is located above the upper surface of the support member 22. The rolling bodies 26 are also movable to a lower position in which each rolling body 26 is located below the upper surface of the support member 22.

A circular holding plate 35 is arranged in an upper central portion of the turntable 21 rotationally relative to the turntable 21 through a thrust bearing 36. The diameter of the holding plate 35 is smaller than the diameter of the central hole Wb of each core piece Wa. The core pieces Wa are not mounted on the holding plate 35. The holding plate 35 is fixed to the support table 18 using a plurality of bolts 37, and the turntable 21 is thus held on the support table 18. The support member 22, which is formed of material that has a high friction coefficient and is soft, is not arranged on the upper surface of the holding plate 35. A metal plate 35A is attached to the upper surface of the holding plate 35 by means of the bolts 37.

Figure 7:
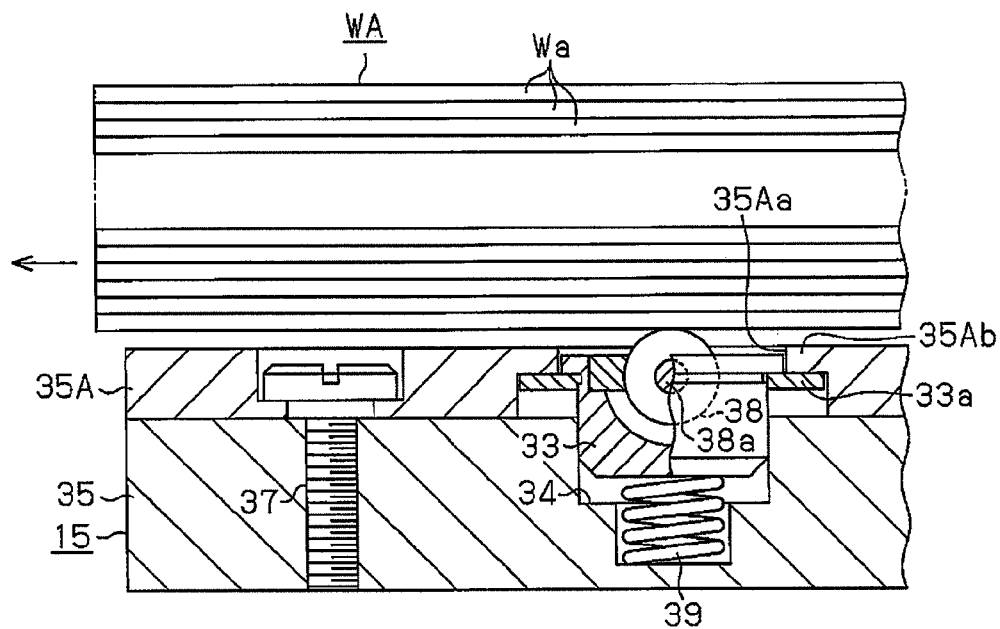
FIG. 7 is an enlarged cross-sectional view showing a portion in the vicinity of an auxiliary rolling body in the rotary lamination apparatus illustrated in FIG. 5.

As illustrated in FIG. 7, a plurality of recesses 34 are formed in the upper surface of the holding plate 35. The metal plate 35A has a plurality of stepped holes 35Aa, which are aligned with the recesses 34. A step 35Ab is formed in the inner circumference of each of the stepped holes 35Aa. Each of the recesses 34 receives a holder 33 movably in a vertical direction. An auxiliary rolling body 38, which is formed by a roller, is supported in each of the holders 33. Each of the auxiliary rolling bodies 38 is rotational about a shaft 38a, which is arranged along a horizontal axis perpendicular to the direction in which a laminated core WA is released. The auxiliary rolling bodies 38 are movable such that at least a portion of each auxiliary rolling body 38 is located above the upper surface of the metal plate 35A. The auxiliary rolling bodies 38 are also movable such that each auxiliary rolling body 38 is located below the upper surface of the metal plate 35A. A spring 39 serving as an urging member is arranged between the bottom of each recess 34 and the corresponding holder 33. As in the first embodiment, each auxiliary rolling body 38 is urged upward by the corresponding spring 39. Each of the holders 33 has an engagement flange 33a, which is formed around an upper outer peripheral portion of the holder 33. Upward movement of each holder 33, which is caused by the urging force of the corresponding spring 39, is restricted through engagement between the engagement flange 33a and the step 35Ab of the corresponding stepped hole 35Aa. Each engagement flange 33a and the corresponding step 35Ab configure a restricting portion for restricting upward movement of the corresponding holder 33, which holds the associated auxiliary rolling body 38. Each auxiliary rolling body 38 rolls in the direction in which the pusher 31 is pressed and projected.

As in the first embodiment, when a punched core piece Wa is rotated and laminated on the turntable 21, the rolling bodies 26 on the turntable 21 are moved to positions below the upper surface of the support member 22. This holds the laminated core WA in friction contact with the upper surface of the support member 22 of the turntable 21. When the laminated core WA is released from the turntable 21, the rolling bodies 26 are moved such that at least a portion of each rolling body 26 is located above the upper surface of the support member 22. The laminated core WA is thus supported on the rolling bodies 26. As a result, the laminated core WA is sent toward the release port 30 while being supported on the rolling bodies 26 and the auxiliary rolling bodies 38 of the holding plate 35, which are rolling.

Accordingly, the second embodiment has advantages substantially similar to the advantages (1) to (4) of the first embodiment and the advantage described below.

(5) In the second embodiment, each auxiliary rolling body 38 on the holding plate 35 is configured by a roller, which decreases the cost of components.

(Modifications)

The illustrated embodiments may be modified to the forms described below.

In the second embodiment, each auxiliary rolling body 38 may be supported at a fixed position. In this case, the upper end of the auxiliary rolling body 38 is arranged to be aligned with the bottom surface of a laminated core WA, which is moved toward the release port 30. In this configuration, components such as the springs 39 may be omitted to simplify the configuration of the apparatus.

A rubber material may be used as urging members instead of at least one of the spring 28 and the spring 39.

Therefore, the present examples and embodiments are to be considered as illustrative and not restrictive and the invention is not to be limited to the details given herein, but may be modified within the scope and equivalence of the appended claims.

The invention claimed is:

1. A rotary lamination apparatus, comprising:
a holding member configured to support a plate from which a workpiece is punched;
a die positioned within an inner periphery of the holding member;
a punch configured to reciprocate up and down so as to punch out a plurality of punched workpieces in cooperation with the die;
a rotary lamination turntable rotational about a vertical axis, wherein the turntable is configured to rotate and laminate a plurality of punched workpieces on the turntable, and the turntable including:
a support member that is arranged on an upper surface of the turntable and formed of a material having a high friction coefficient compared to metal;
a plurality of rolling bodies mounted on the upper surface of the turntable, wherein the rolling bodies are selectively movable between an upper position, in which at least a portion of each of the rolling bodies is located above an upper surface of the support member, and a lower position, in which each rolling body is located below the upper surface of the support member, wherein, in the upper position, the rolling bodies support the workpieces movably in a lateral direction; and
a plurality of urging members for urging the rolling bodies upward.

2. The rotary lamination apparatus according to claim 1, wherein the support member is formed of a soft material compared to metal.

3. The rotary lamination apparatus according to claim 1, wherein the rolling bodies are balls that are rotational in any direction.

4. The rotary lamination apparatus according to claim 3, wherein the turntable further includes:
a plurality of holders each supporting a corresponding one of the rolling bodies, wherein the holders are supported by the turntable such that the holders are movable in a vertical direction by the urging members; and
a plurality of restricting members, wherein each restricting member restricts upward movement of a corresponding one of the holders caused by the associated urging member.

5. The rotary lamination apparatus according to claim 1, wherein
an upper portion of the turntable has an annular shape,
the support member has an annular shape,
the rotary lamination apparatus further comprises a circular holding plate arranged inside the upper portion of the turntable, and
the holding plate has a plurality of auxiliary rolling bodies arranged on the upper surface of the holding plate.

6. The rotary lamination apparatus according to claim 5, wherein each of the auxiliary rolling bodies is a roller.

7. The rotary lamination apparatus according to claim 1, further comprising the turntable being positionable within the inner periphery of the holding member.

* * * * *